United States Patent [19]

Satake

[11] Patent Number: 4,861,619
[45] Date of Patent: Aug. 29, 1989

[54] METHOD FOR PRODUCING MAGNETIC RECORDING MEDIUM

[75] Inventor: Tetsuo Satake, Osaka, Japan

[73] Assignee: Matsushita Electric Industrial Co., Ltd., Kadoma, Japan

[21] Appl. No.: 45,491

[22] Filed: May 4, 1987

[30] Foreign Application Priority Data

May 8, 1986 [JP] Japan ................... 61-105250

[51] Int. Cl.⁴ .............................................. B05D 3/14
[52] U.S. Cl. ....................................... 427/48; 427/128; 427/130; 428/694; 428/900
[58] Field of Search ................ 427/48, 128, 130; 428/694, 900

[56] References Cited

U.S. PATENT DOCUMENTS 3,117,065  1/1964  Wootten .................... 204/20

*Primary Examiner*—Bernard Pianalto
*Attorney, Agent, or Firm*—Cushman, Darby & Cushman

[57] ABSTRACT

A magnetic field orientation for producing a magnetic recording medium is made by using plural moving magnet which are driven in a direction parallel to the running direction of a nonmagnetic base film having a magnetic layer thereon; thus the time period during which the magnetic particles in the magnetic paint coated on the nonmagnetic base receive orientation can be varied independent from coating velocity.

1 Claim, 3 Drawing Sheets

UPPER NUMERALS: VELOCITY OF MAGNET

LOWER NUMERALS: RELATIVE SPEED BETWEEN MAGNETIC RECORDING MEDIUM AND ORIENTING MAGNET

METHOD FOR PRODUCING MAGNETIC RECORDING MEDIUM

FIELD OF THE INVENTION AND RELATED ART STATEMENT

1. Field of the Invention

The present invention relates generally to method of and apparatus for producing a magnetic recording medium such as a magnetic tape for audio and video uses and a magnetic disk, and more particularly to a magnetic field orientation process and the apparatus therefor.

2. Description of a Related Art

A magnetic recording medium, as is known, is required to have high remanent magnetic flux density Br in order to improve electromagnetic characteristics such as a sensitivity, a reproducing level and an S/N ratio. In a manufacturing process of the magnetic recording medium of a coating type, a magnetic field orientation process is generally applied in order to orient easy axis of magnetization of magnetic particles toward a direction of recording tracks. On the contrary in case of a magnetic disk, the magnetic field orientation process is applied to cause random orientation and in order not to cause fluctuation of the reproducing output. In the magnetic disk recording and reproducing system, a magnetic head gap is placed on a surface of the rotating magnetic disk in parallel to radius direction thereof. Generally, in a tape-shaped magnetic recording medium as a blank of the magnetic disk, a maximum reproducing output is generated when the magnetic head traces along a longitudinal direction thereof, and generating a minimum reproducing output along a width direction. Thereof the orientation of the magnetic particles for the magnetic disk is preferable to be random, so that modulation effect is alleviated.

Conventional processes in the prior art for realizing random orientation in the magnetic disk are shown in U.S. Pat. No. 4,580,955 and U.S. Pat. No. 4,518,626, for example. Another process using a rotating orientation magnet in order to realize random orientation is proposed in U.S. Pat. No. 4,518,627.

Generally, the magnetic field orientation process is applied to the magnetic recording medium by placing it in a magnetic field before a coated magnetic layer on a nonmagnetic base dries. Magnetic particles in the coated magnetic layer are subjected to rotation in the magnetic field and are oriented toward the direction of the magnetic field. However, since the paint including the magnetic particles has some viscosity, sometimes the magnetic field orientation process is finished before sufficient rotation of the magnetic particles in the coated magnetic layer is realized, and a complete orientation of the magnetic particles is not realized due to the viscosity. Further recently, since further fine magnetic powder having high surface area ratio is used for producing a high-grade magnetic recording medium, the viscosity of the magnetic paint is higher than the conventional magnetic paint. Hence, a long time period is required to rotate the magnetic particles, and insufficient orientation of the magnetic particles is resulted in the conventional magnetic field orientation process. In order to solve the above-mentioned problem, a method for applying a strong DC current magnetic field by using a superconduction solenoid magnet is shown in U.S. Pat. No. 4,508,752, for example.

The magnetic recording medium which was oriented by the above-mentioned process is required to be immediately dried by a drying process in order to maintain the oriented state, because the magnetic particles after orientation process is unstable and intend to return to original random oriented state. For example, U.S. Pat. No. 4,587,066 discloses a quick drying method after orientation by means of electron beam curing.

As mentioned above, in the orientation process, a first time period wherein the magnetic recording medium stays in the magnetic field of the orientation process after coating of the magnetic paint, and further, a second time period from finish of orientation to arrival to the drying process zone are important factors to determine the characteristics of orientation of the magnetic particles.

Since, these time periods are determined by coating velocity of the magnetic paint in the above-mentioned conventional magnetic field orienting apparatus, both the time periods can not be individually controlled. An attempt for obtaining a high oriented state by reducing coating velocity is not practical owing to the problems such as decreased production efficiency and remaining solvent.

OBJECT AND SUMMARY OF THE INVENTION

An object of the present invention is to provide a magnetic field orientation method of and apparatus for making a magnetic recording medium wherein high oriented state is attainable without loss of a coating velocity.

Another object of the present invention is to provide a magnetic field orientation process of and an apparatus for making the magnetic recording medium wherein a high square ratio is realized by an effective orientation method and splendid electromagnetic characteristics such as a sensitivity, a reproducing output level, an S/N ratio and so on can be improved.

Further object of the present invention is to provide a magnetic field orientation process of the magnetic recording medium wherein high oriented state is obtainable in a high-grade and high density magnetic recording medium using a high viscosity magnetic paint.

The method for producing a magnetic recording medium in accordance with the present invention comprises:

coating process for coating a magnetic paint on a nonmagnetie substrate in a state of running with a predetermined velocity, orientation process for orienting magnetic particles in the magnetic paint coated on the nonmagnetic substrate by at least one pair of magnets moving parallelly to the running direction of the nonmagnetic substrate, and drying process of rapidly drying the coated magnetic paint during the running.

An apparatus for producing a magnetic recording medium in accordance with the present invention comprises:

a coating means for coating a magnetic paint on a nonmagnetic substrate in a state of running at a predetermined velocity, orientation processing device for orienting magnetic particles in the magnetic paint coated on the nonmagnetic substrate, comprising at least one pair of magnets moving parallelly to running direction of the nonmagnetic substrate, and drying means for rapidly drying the coated magnetic paint during the running.

As mentioned above, since relative moving speed between the magnetic recording medium and the orientation magnets can be varied by controlling the moving speed of the orientating magnets, the time period wherein the magnetic particles receive orientation can be varied independent of the coating velocity. On the other hand, the time period which is required to dry the magnetic layer can be varied by variation of the coating velocity, and thereby, easy axis of magnetization of the respective magnetic particles are oriented along lines of magnetic forth of the orienting magnets and coincide with the direction of the recording track. Hence, high square ratio is realized.

DESCRIPTION OF THE PREFERRED EMBODIMENT

Figure 1:
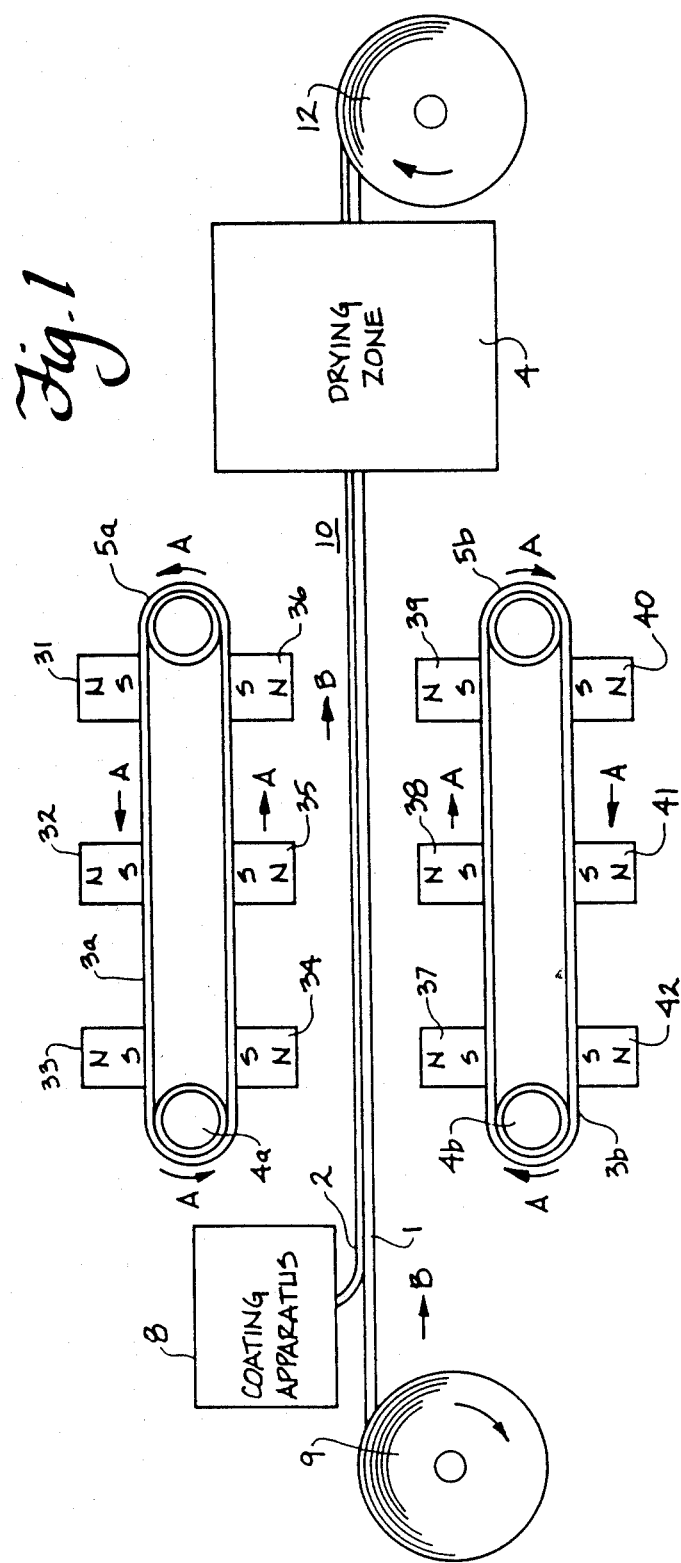
FIG. 1 shows an apparatus for embodying a magnetic field orientation process of a magnetic recording medium in accordance with the present invention.

An apparatus for embodying a magnetic field orientation process in accordance with the present invention is shown in FIG. 1.

Referring to FIG. 1, a nonmagnetic base 1, which is generally a thin film, is made of polyethylenetelephthalate, for example. A magnetic layer 2 is coated on the surface of the nonmagnetic base 1 by a known coating apparatus 8. An orientation processing device 3a having plural permanent magnets 31–36 is placed over the magnetic layer 2. Another orientation processing device 3d having plural permanent magnets 37–42 is placed under the nonmagnetic base 1. The respective orientation processing devices 3a and 3b comprises belts 5a and 5b, respectively. The respective permanent magnets of both the orientation processing devices 3a and 3b are mounted on the respective belts 5a and 5b so that N poles of the respective permanent magnet 31–40 face to the nonmagnetic base 1 or the magnetic layer 2 at their pole-faces, respectively, when the each permanent magnet approaches the nonmagnetic base 1 or the magnetic layer 2. These permanent magnets act as orienting magnets. Both the belts 5a and 5b are driven by driving means 4a and 4b, respectively, and the permanent magnets 31–36 and 37–40 of the orientation processing device 3a and 3b are moved to a direction as shown by allows A, respectively. Moving velocities of both the belt 5a and 5b are synchronized each other so that the respective magnets mounted on both the belts 5a and 5b are face to the face with each other putting the nonmagnetic base 1 and the magnetic layer 2 inbetween.

The nonmagnetic base is taken out from a supplying roll 9 and travels in a direction as shown by arrow B, and the magnetic layer 2 is coated on their surface under a coating apparatus 8, thereby composing a magnetic recording medium 10. The magnetic recording medium 10 passes between the orientation processing devices 3a and 3b, and travels through a drying zone 4, and lastly is wound by a winding roll 12. A moving direction of the permanent magnets facing to the magnetic recording medium 10 is freely selected by switching rotational direction of the driving means 4a and 4b. Furthermore, the driving means 4a and 4b are capable of varying driving speed. In FIG. 1, the respective belts 5a and 5b are driven so that the respective portions of the belts 5a and 5b facing to the magnetic recording medium 10 move to a direction as shown by the arrow A which is identical to the travelling direction of the magnetic recording medium 10.

A concrete example of the magnetic field orientation process is described hereinafter.

The following materials are mixed in a ball mill for 48 hours:

| | |
|---|---|
| Co coated γ-Fe$_2$O$_3$ | 100 weight part; |
| Polyurethane | 10 weight part; |
| Nitrocellulose | 10 weight part; |
| Stearic acid | 2 weight part; |
| Lecithin | 1 weight part; |
| Alumina | 5 weight part; |
| Carbon black | 3 weight part; |
| MEK-toluene-cyclohexane (ratio 5:3:2 in weight part) | 300 weight part. |

Nextly, 4 weight part of hardening agent is added to the mixture, and is mixed in a disper for 30 minutes in order to obtain a magnetic paint. The magnetic paint is coated on a surface of a polyethylenetelephthalate film as a nonmagnetic substrate or base 1 to a thickness of about 4 micron under a coating velocity of 150 m/min.

Subsequently, the polyethylenetelephthalate film coated with the magnetic paint is moved between the orientation processing devices 3a and 3b, and the magnetic particles in the magnetic paint are oriented.

Figure 2:
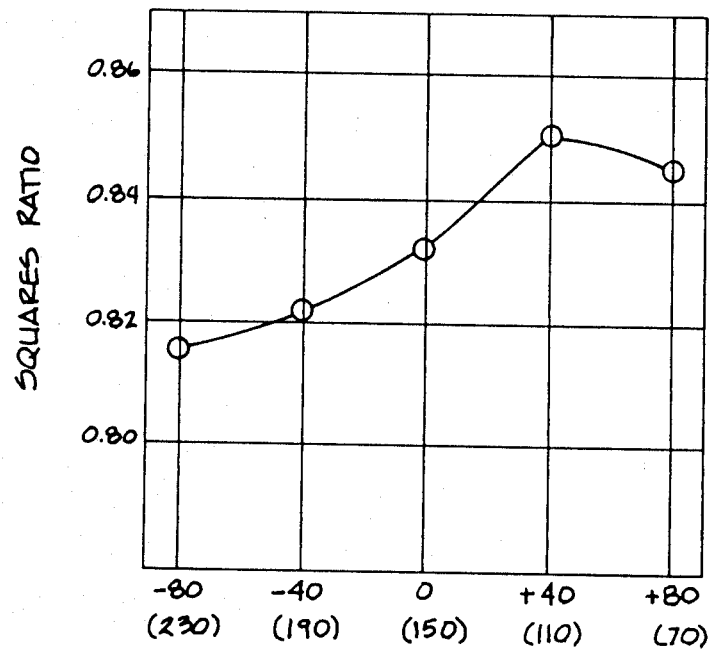
FIG. 2 is a graph showing relation between a relative speed of magnets and a square ratio in the magnetic field orienting apparatus as shown in FIG. 1.

The squares ratio of the magnetic recording medium which is produced by the above-mentioned process corresponding to the relative speed between the permanent magnets 31–42 and the nonmagnetic base 1 is shown in FIG. 2. Referring to FIG. 2, the ordinate is graduated with the squares ratio, and the abscissa is graduated with the relative speed between the permanent magnets and the nonmagnetic base 1, which are shown in parentheses, and the moving velocity of the permanent magnets which are shown in upper line. The (+) sign before the numerals designates that the moving direction of the permanent magnets are identical with that of the nonmagnetic base 1, and (−) sign designates that the moving direction of the permanent magnets are inverse to the moving direction of the nonmagnetic base 1. Strength of magnetic field of each permanent magnet is 2400 oerstes.

In the above-mentioned example, the maximum value 0.85 of the squares ratio was attained at +40 m/min of the moving velocity of the permanent magnets and 110 m/min of the relative speed. The distance between the permanent magnets and the nonmagnetic base 1 is 10 mm in this embodiment.

Figure 3:
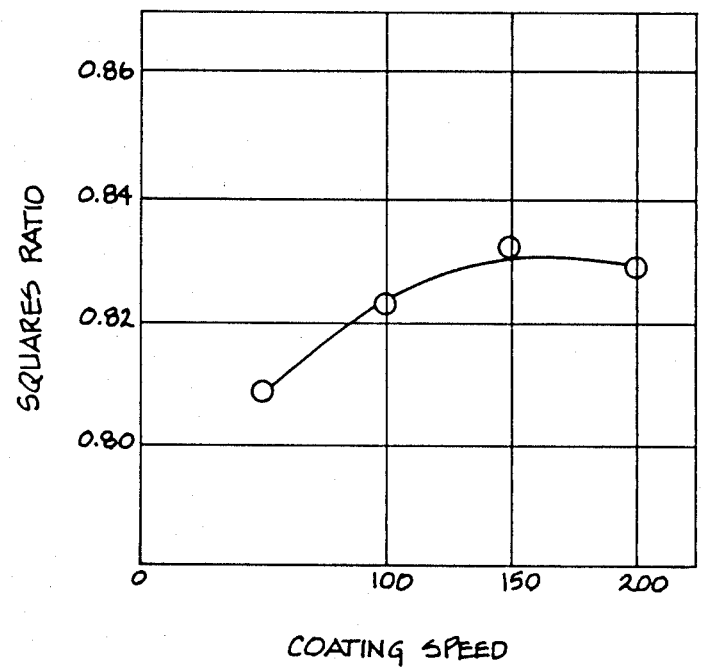
FIG. 3 is the graph showing relation between the coating velocity and the square ratio in the magnetic field orienting apparatus using the fixed magnet in the prior art.

The squares ratio in the conventional magnetic field orientation process wherein the same magnetic paint as mentioned above is used and a pair of the orienting magnets are fixed at an upper and a lower positions of the nonmagnetic base is shown in FIG. 3 is a comparative example. The oridinate and the abscissa in FIG. 3 are graduated with the squares ratio and the coating velocity, respectively. As is shown by FIG. 3, the maximum value 0.83 of the squares ratio was attained at 150 m/min of the coating velocity. As a result, the squares ratio in accordance with the present invention is obviously superior to that of in the prior art.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A method for producing a magnetic recording medium comprising:

providing a nonmagnetic substrate;

mounting said nonmagnetic substrate for movement along a conveyance path;

conveying said nonmagnetic substrate at a predetermined velocity along said conveyance path;

coating said nonmagnetic substrate with a magnetic paint as said nonmagnetic substrate is being conveyed at said predetermined velocity;

providing at least one pair of magnets in spaced apart facing relation such that the poles of the magnets that are in facing relation are of the same polarity;

conveying said pair of magnets along a path parallel to said conveyance path at a velocity which is lower than said predetermined velocity of said nonmagnetic substrate;

orienting magnetic particles in said magnetic paint coated on said nonmagnetic substrate by conveying said nonmagnetic substrate between the magnets of said at least one pair; and drying said magnetic paint coated on said nonmagnetic substrate as said substrate is being conveyed.

* * * * *